No. 868,697. PATENTED OCT. 22, 1907.
R. H. REED & H. WILCOX.
RAZOR.
APPLICATION FILED JULY 27, 1906.
2 SHEETS—SHEET 2.
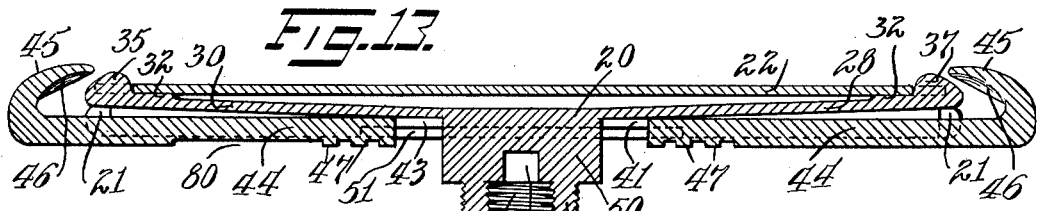
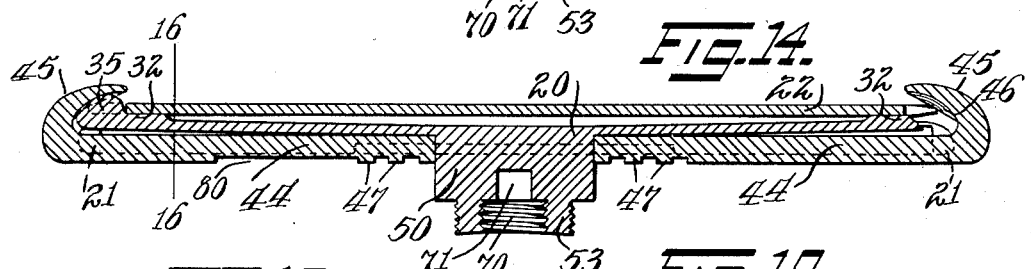
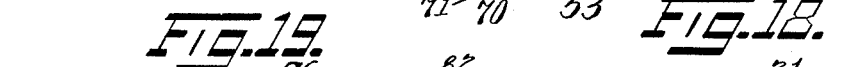
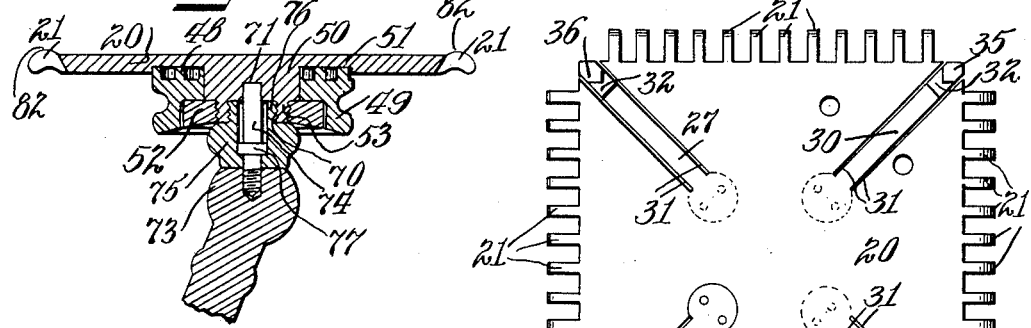
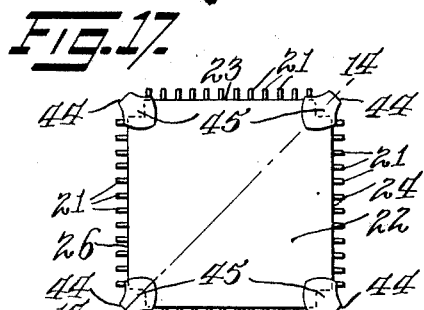
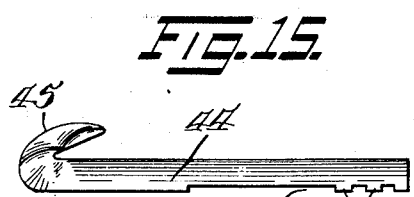
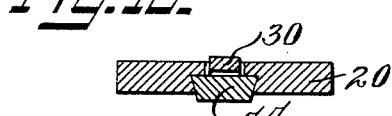
Witnesses:
Inventors:
Richard H. Reed,
Henry Wilcox,
By their Attorney,

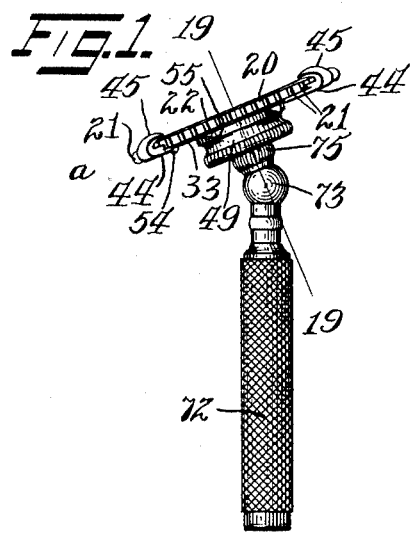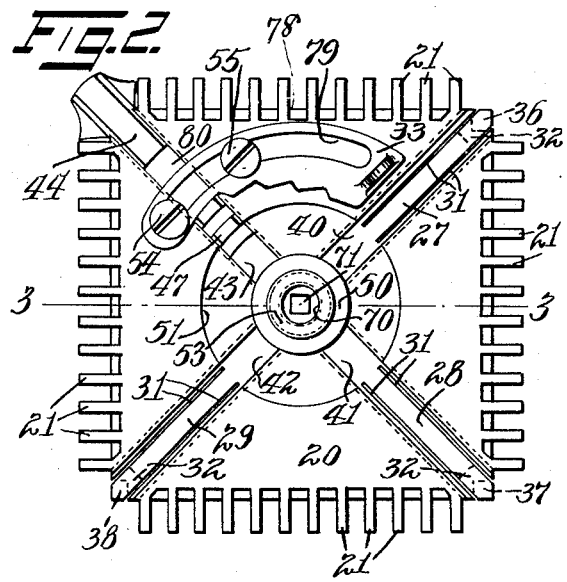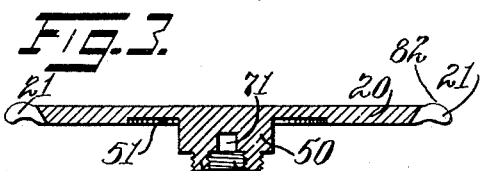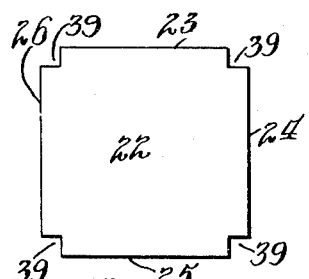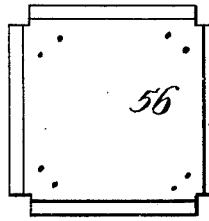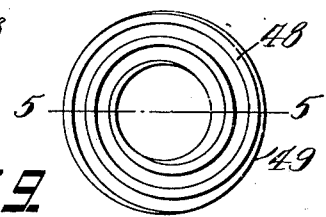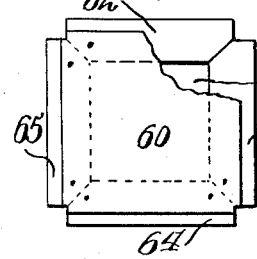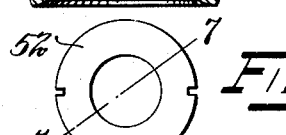

UNITED STATES PATENT OFFICE.

RICHARD H. REED, OF NEW YORK, N. Y., AND HENRY WILCOX, OF NEWARK, NEW JERSEY, ASSIGNORS TO THE PATENT OWNERSHIP COMPANY, OF NEW YORK, N. Y., A CORPORATION OF NEW YORK.

RAZOR.

No. 868,697.　　　Specification of Letters Patent.　　　Patented Oct. 22, 1907.

Application filed July 27, 1906. Serial No. 327,994.

*To all whom it may concern:*

Be it known that we, RICHARD H. REED, a citizen of the United States, residing at New York city, in the county of New York and State of New York, and HENRY WILCOX, a citizen of the United States, residing at Newark, in the county of Essex and State of New Jersey, have invented certain new and useful Improvements in Razors, of which the following is a specification.

This invention relates to razors of the type generally known as safety razors, in which a blade is supported adjacent a frame member, which member is sometimes formed with serrations or teeth, and termed a guard plate, the teeth projecting beyond the cutting edge of the razor to prevent it from cutting the face. This form of razor is provided with a frame member, and a number of blades are furnished with the frame constituting an outfit, when the razor is placed on the market; the blades being detachable, to be removed from the frame when dull for the purpose of sharpening; or of substitution by other blades, the dull blade being discarded.

One of the objects of the invention is to provide a razor blade and frame wherein the blade is supported at its end or corner portions only, the blade being sufficiently rigid to operate without support between such end or corner portions.

Another object of the invention is to provide a blade of suitable polygonal form with cutting edges on all of its sides.

A further object is to provide in connection with such a blade, a form of frame for suitably supporting the blade and which will engage the blade at the corner portions only.

A further object is to provide means, preferably resilient, for supporting the blade with its edges offset from the guard portion of the frame member, which means is adjustable to vary the distance between the blade and the frame member.

Another object of the invention is to provide a frame member, and a blade, in which the frame member is provided with supporting means for adjustably holding the blade offset from the frame, and which device is further provided with a detachable handle, but which handle is entirely independent of the means for supporting the blade on the frame member.

A further object of the invention is to provide an improved form of blade that is of sufficient thickness to be comparatively rigid and not require support throughout its entire area, and with its edge portions considerably reduced to provide a cutting edge.

A further object is to provide in such a blade a cutting member of extreme thinness whereby the cutting edge is produced with comparatively little grinding, and to provide one or more stiffening plates permanently secured to one or both sides of the blade; but which terminate a short distance from the cutting edges.

A further object of the invention is to provide in combination with a frame member and removable blade supported offset from the one side of the frame member with means for varying the distance the cutting edge is removed from the guard portions at the edge of the frame, of adjustable means for limiting the movement of the supporting means on the frame whereby the distance between the blade and the guard portions can be accurately determined and controlled.

In the accompanying drawings representing embodiments of our invention, Figure 1 is a side elevation of the assembled device. Fig. 2 is a rear view of the frame member with certain parts removed. Fig. 3 is a section on the line 3—3 indicated in Fig. 2. Fig. 4 shows the nut member for simultaneously actuating the slides. Fig. 5 is a section of the nut member on the line 5—5 indicated in Fig. 4. Fig. 6 shows the clamping ring for holding the nut member in place. Fig. 7 is a section on the line 7—7 indicated in Fig. 6. Fig. 8 is a plan view of one form of blade. Fig. 9 is a partial section of the blade. Fig. 10 shows a reinforced blade. Fig. 11 is an end view of the blade shown in Fig. 10. Fig. 12 shows another modified form of blade. Fig. 13 is an enlarged section taken on the line 14—14 indicated in Fig. 17. Fig. 14 is a view similar to Fig. 13 with the parts in other positions. Fig. 15 is a side elevation of one of the slides as shown in Fig. 14. Fig. 16 is a transverse section on the line 16—16 indicated in Fig. 14. Fig. 17 is a plan view of the device assembled. Fig. 18 is a top view of the frame member. Fig. 19 is a transverse section through the assembled device on the line 19—19 indicated in Fig. 1; and Fig. 20 shows the relative position of the blade and frame member.

The device comprises essentially three members; a blade member, a frame member provided with means whereby the blade is supported offset from one face of the frame member with its cutting edges removed at variable distances from the frame member; and a third member that is separate and distinct from the other two members, and which is an elongated handle member; but it is to be understood that the device is practically complete and operable without the addition or use of this handle member; the attachment and detachment of the blade to the frame member, and its adjustment relative thereto, being absolutely free and independent from the handle member. The frame member and one or a number of the blades can thereby be put up in a comparatively small package or case for facilitating the transportation or storage of the device; but a better purchase on the razor is obtained by the use of the detachable handle, and even with this addition the razor is still within the limits enabling the use of a small case and could readily be carried by the user.

In the construction illustrated, the frame member is shown as comprising a plate or block 20 of polygonal outline generally. In the form shown the frame is substantially rectangular, and provided with guard portions along the four sides, that are shown as formed by projecting teeth 21, preferably curved upward towards the blade edge at 82 as shown. The frame member 20 is of a size to coöperate with a polygonal blade of the same general form, hence as shown is also rectangular. The blade 22, shown in Fig. 8, is provided with four cutting edges 23, 24, 25 and 26; that when the blade is assembled on the frame member will preferably project a slight distance beyond the frame sides at the base of the teeth 21.

For the purpose of setting the cutting edges at the proper distance away from the guard as required for shaving under different conditions, means are provided for so holding the blade in place relative to the frame member that the blade may be pressed away from the frame member by springs or analogous means, preferably resilient. The distance through which the blade may be thus pressed away from the frame member being limited by stops which are made adjustable for the purpose.

The frame member is provided with stops or retaining means whereby the blade may be limited in the distance through which it can be pressed away from the frame member for securing the proper adjustment between the guard teeth and the cutting edge of the blade; for this purpose such retaining means are made adjustable and the resilient means for constantly pressing outwardly the blade from the frame member operate to hold the blade outwardly against the said adjustable retaining means as far as the position of these in any given instance will permit. Thus the blade is held at all times outwardly from the frame member clear and free thereof and the edge of the blade is brought into proper relation with the guard teeth, while the cutting edge stands free therefrom. In the construction illustrated we provide spring blades 27, 28, 29 and 30 that may be integral with the guard plate 20, being formed by slits or serrations 31, made parallel in the plate 20, and extending from the corner portions thereof inward for about half the distance to the center; the arrangement of these being thereby somewhat radial. But if preferred these springs may be separate members secured to the plate 20, as the spring 28 is shown. These springs are bent up from the plate whereby their free ends project a short distance beyond the plane of one face of the plate, that is, the springs are inclined in the same direction. The end portions of these springs, and the portions of the blade are so constructed that the blade will be accurately positioned when placed on the springs, and will be prevented from any lateral shifting from such position when supported from the frame member. In the construction shown the springs are provided with projections or lugs 35, 36, 37 and 38 having right angled inner edges as shown; and the blade is shown as provided with recess portions 39 at its four corners, the walls of the recess portions being arranged to engage these walls of the lugs when the blade is placed on the springs. The springs are also provided with raised parts 32 that engage the blade and retain it offset from the plate 20. It will be observed from Fig. 8 that the end portions of each of the cutting edges is provided with a transverse abutment face, which faces coöperate with the holding means on the frame member to locate and precisionize the blade when placed on the holder and prevent any lateral displacement of the blade.

Means are provided at each of the engaging portions of the blade and springs, that is at the four corners of the frame member, for limiting the outward movement of the blade by the springs, and such means are preferably simultaneously adjustable so that the four corners are always the same distance removed from the holder, as the blade is adjusted. In the construction illustrated, four slide members are provided whose general construction is substantially identical. The frame member is provided with channel portions 40, 41, 42 and 43 whose side walls are adjacent the serrations forming the spring members; the side walls of the channels being undercut. In each of these channels operates a slide 44, having its side walls inclined to form a dovetail arrangement as shown in Fig. 16, preventing the slides from falling out of the channel portions. The outer ends of the slides are given a bend as 45, that extend over the corner portions of the frame member, as shown in Figs. 13 and 14. The underside of the bent or hook portions is inclined, and the top faces of the lugs 35, etc. are similarly inclined. The hook portions 45, when the blade has been placed on the spring members, and by these held elevated above the face of the frame member, will engage the corner portion of the blade upon the slides being moved toward the center or inward. And the distance the slide is moved inward will determine or limit the amount of outward movement given to the blade by the springs, that is, the distance the cutting edge of the blade at each side is removed from the guard portion of the frame member. The inner face of the hook is preferably provided with a channel 46 wide enough to receive the lug member therein, the side portions of the hook engaging the blade on each side of this lug, that is, on each side of its recess corner portion. Means are also provided for simultaneously operating the slides, that is, moving them inward and outward the same amount, and for retaining them equi-distant from the center. In the form illustrated, each slide is provided with teeth 47 on its outer face, and these teeth are engaged by the spiral thread 48 of a nut member 49. This member rotates on a post 50 projecting from one face of the frame member, and preferably operates in an annular channel 51 in the frame member. The nut member is retained from axial movement by means of a threaded ring 52 that screws on the reduced portion 53 of the post and is locked thereon. The turning of this nut member will, by the engagement of its threads with the teeth of the slides, cause the slides to move in and at the same time and for the same distance; thereby limiting the outward movement of the blade by the springs on the frame member equally at the corners, keeping the blade parallel with the frame member.

Suitable means are provided for limiting the movement of the slides to bring the blade at various predetermined positions removed or offset from the guard portions. In Fig. 2 a stepped plate 33 is shiftable across one side of the frame member. The plate has a curved slot 79 through which pass retaining screws 54 and 55, the plate being thereby shiftable through an arc, and moves across the slide member 44, that is channeled at 80, as indicated in Fig. 15. The end walls of this channel will engage the opposite edges of the plate 33 and thereby limit the movement of the slide, in one or both directions. One engaging side or edge of the plate 33 is provided with stepped portions 78 as shown in Fig. 2. These stepped portions engage one wall of channel 80 on the slide and thereby vary the limit of movement of the slide in one direction as such step is brought to position of engagement with the slide, each successive step being a different distance removed from the center.

When the blade is supported at its corner portions only, it must be of sufficient thickness to provide the necessary rigidity, to prevent bending or chattering of its cutting portions. When the blade is constructed of a single piece of metal it is about twenty-one thousandths of an inch in thickness. To provide a suitable cutting edge for a blade of such thickness, it is found preferable to first grind the blade to the form of a double concave edge, such as is usually used in the construction of razors of the usual type. But the blade may be formed of a cutting member considerably thinner, of approximately three thousandths of an inch thick, and provided with one or more stiffening members, permanently secured on one or both sides of the blade. These stiffening members in the form shown in Fig. 11 comprise two plates 56 and 57 permanently secured on each side of the blade 58, such as by rivets. But these plates do not extend to the cutting edges.
With this construction the cutting edges of the blade require very little sharpening or honing, on account of the extreme thinness of the metal.

Another form of blade is shown in Fig. 12, in which there are two stiffening plates 60 and 61 between which are riveted four blade members 62, 63, 64 and 65, that each constitute one of the side cutting members of the polygonal blade. These blade members have mitered adjacent edges at which they are in engagement, leaving a space at the middle part of the blade. The general form and outline of the blade in this construction is similar to that shown in Fig. 11, but obviously less metal is used.

A detachable handle is provided for the frame member, and in the construction shown, the handle is inclined at one portion. The attachment of the handle member is so constructed that the position of the handle can be varied, and the same inclination given with relation to each of the cutting edges. In Fig. 1 the handle is inclined towards one of the cutting edges, there denoted by a. The handle can be detached and then connected so that the same inclination of the handle can be given toward each of the other three cutting edges of the razor. In the construction shown the post 50 is provided with a threaded bore 70 extending a short distance, and in the bottom of this bore is a reduced bore 71 of polygonal shape corresponding to the polygonal shape of the frame member. In the form shown the bore 71 is square. The handle member comprises a shank 72 having a bent portion 73 from which projects a square tongue 74 fitted to enter the square bore 71. When in this position the handle shank will be inclined at a certain angle toward one of the sides of the device. Upon removing the handle and giving a quarter of a turn, the handle will be given the same inclination to one of the adjacent sides. By this means the handle can be inclined toward any one of the four sides of the razor. Suitable means are provided for locking the handle in such position. In the form shown a nut member 75 is rotatably secured on the attaching end and has a reduced threaded portion 76 arranged to screw into the threaded bore 70 of the post 50. This nut 75 engages a flange 77 on the tongue 74, which prevents the removal of the nut member from the handle and at the same time serves to lock the tongue and handle securely to the frame member. But it is to be clearly understood that the handle member is entirely separate and distinct from the holder member, and the holder member is independent of the handle member. That is, the blade is supported from the frame member and adjustably connected therewith, absolutely without any aid of the handle member. With the blade properly positioned and the handle member detached, the device is practically operative. The outer end portions of the nut member 49 and its retaining ring 52 are formed concave with their surfaces merging, as shown in Fig. 19. This forms a convenient means of gripping the device, by inserting the thumb in such concave portion and placing the fingers on the flat back of the device, which will be against the blade between its edges. In this form the razor is also very compact and can be carried in a very small case, which will permit its insertion in a small space such as a vest pocket or the like.

In Fig. 13 the limiting stop members are shown in their outer position, in which the blade is placed in position on the holder and by its portions adjacent its four recess corners will engage the outer raised portions of the spring members, adjacent the lugs thereon. By these springs the blade is pressed outwardly from the plate 20, and held offset from the frame member. Upon rotating the nut and drawing inward the four limiting stop members, the engagement of the inclined under faces of the hook portions, with the blades adjacent their recess portions, as indicated at the right hand in Fig. 14, will vary the distance outward the blade is pressed by the spring members. Upon moving these parts inward to their limit, the blade will be pressed outward a minimum distance by reason of the stops being in such position; which position is indicated in Fig. 14, the slides having been moved inward until they engage the post 50. But in this position it will be observed that the blade is entirely free and clear from the frame or plate 20, and it will be further seen that the spring members are also free and clear of the holder plate 20.

By reason of the space provided between the blade and the frame member, as shown in Figs. 14 and 20, the lather and hair that will be forced between the edge of the blade and the guard portion of the holder, can have free and unobstructed movement inward, and will not tend to clog and close this space, as they would do if the space were closed; but the material can pass clear through to the opposite side of the device, and can even pass outward at the two adjacent sides. This free space is indicated at 83 in Fig. 20.

Having thus described our invention, we claim:

1. As a new article of manufacture, a comparatively thin razor blade having cutting edges on a plurality of sides, the blade having a stiffening plate permanently secured to one or both sides thereof, with the cutting edges of the blade projecting beyond the stiffening plate or plates.

2. As a new article of manufacture, a comparatively thin razor blade having cutting edges on two opposite sides, the blade having a stiffening plate permanently secured to one or both sides thereof with the cutting edges of the blade projecting beyond the plate or plates.

3. As a new article of manufacture, a comparatively thin razor blade of polygonal shape having cutting edges on all of its sides, and a stiffening plate permanently secured to each side of the blade with the cutting edges of the blade projecting beyond the plates.

4. As a new article of manufacture, a comparatively thin razor blade of polygonal shape, having a stiffening plate permanently secured to one or both sides, the blade projecting beyond the plates except at the corner portions.

5. As a new article of manufacture, a comparatively thin razor blade having cutting edges on opposite sides and provided with recesses at the end portions of the cutting edges, the blade having a stiffening plate permanently secured to one or both sides thereof with the cutting edges of the blade projecting beyond the plate, or plates.

6. As a new article of manufacture, a comparatively thin razor blade of quadrangular shape having cutting edges on all of its four sides, and a stiffening plate permanently secured to each side of the blade with the cutting edges of the blade projecting beyond the plates.

7. As a new article of manufacture, a comparatively thin razor blade of quadrangular shape having recesses at its corner portions, the blade having a stiffening plate permanently secured to each side with the cutting edges of the blade projecting beyond the plates.

8. In a razor, the combination of a frame member, a blade, springs on the frame member arranged to press the blade away from the frame member, a series of slides movable on the frame member and being organized to limit the outward movement of the blade by the springs, and means for simultaneously operating the slides.

9. In a razor, the combination of a frame member, a blade, springs on the frame member arranged to press the blade away from the frame member, a series of slides movable on the frame member and having inclined portions organized to engage the blade and limit the outward movement of the blade by the springs, and means for simultaneously operating the slides.

10. In a razor, the combination of a frame member provided with springs, a blade shaped to engage the frame member on one face, a series of slides movable on the frame member and provided with inclined portions arranged to engage the blade and limit its movement by the springs, teeth portions on the slides, and a rotary member on the frame member provided with a spiral rib on one face engaging the teeth of the slides whereby the slides are simultaneously operated.

11. In a razor, the combination of a frame member having guard portions along each of its sides, a polygonal blade having cutting edges on its sides shaped to coöperate with the guards when connected with the frame member, springs carried by the frame member and organized to move the blade outward from the frame member, lugs on the springs, the blade having recesses and disposed to fit between the lugs on the springs, and means organized to limit the outward movement of the blade by the springs.

12. In a razor, the combination of a polygonal frame member, a razor blade of similar shape, springs on the frame member organized to move the blade away from the frame member, lugs on the springs, the blade having recesses at the corners and disposed to fit between the lugs on the springs, a series of slides radially movable on the frame member having inclined portions arranged to engage the blade and limit its outward movement, and means for simultaneously operating the slides.

13. In a razor, the combination of a frame member, a blade, springs carried by the frame member organized to press the blade away from the plate, lugs on the springs, the balde having recess portions at its corners arranged to fit the springs adjacent the lugs, a series of radially movable slides carried by the frame member opposite the spring portions, the slides being provided with hook portions having the inner face inclined and disposed opposite said lugs, whereby the inward movement of the slides will variably limit the outward movement of the blade by the springs, the slides having teeth portions, and a nut member having a spiral thread on one face engaging the teeth of the slides whereby the latter are operated.

14. In a razor, the combination of a frame member, a blade, the frame member being provided with springs arranged to press the blade away from the plate, lugs on the springs, the plate having recess portions at its corners arranged to fit the springs adjacent the lugs, a series of radially movable slides carried by the frame member opposite the spring portions, the slides being provided with hook portions having the inner face inclined and located opposite said lug portions, the hook portions having slots engaging the lugs, whereby the movement of the slides will variably limit the outward movement of the blade by the springs, the slides having teeth portions, and a nut member having a spiral thread on one face engaging the teeth of the slides whereby the latter are operated.

15. In a razor, the combination of a frame member, a blade, springs located on the frame member arranged to press the blade outward from the frame member, a series of slides radially movable on the frame member and having inclined portions arranged to engage the blade, means for simultaneously operating the slides to variably limit the outward movement of the blade by the springs, and adjustable means for limiting the movement of the slides.

16. In a razor, the combination of a frame member, a blade, springs on the frame member to press the blade off therefrom, slides radially movable on the frame member to variably limit the outward movement of the blade by the springs, means for simultaneously operating the slides, a plate having stepped portions and shiftable on the frame member across one of the slides, the latter slide having a shoulder portion arranged to engage the step portion of the plate to adjustably limit the movement of the slides in one direction.

17. In a razor, the combination of a polygonal plate having guard portions at its sides, a polygonal blade having cutting edges at each of its sides arranged to coöperate with the guards when secured to the plate, the guard plate having radially extending slots on one face with the opposite sides under-cut, slides having beveled side portions and movable in the slot portions of the plate, the slides having hooked portions extending around the corners of the guard plate to the opposite face, the inner faces of the extensions being inclined, spring portions on the guard plate at the bottom wall of the slot portions forming springs that extend normally outward away from the slotted side of the plate, lugs on the end of the spring portions lying beneath the inclined extensions, the blade having recesses at its corners to fit between the lugs of the springs and be engaged by the inclined portions of the slides, a post on the slotted side of the guard plate, a nut member rotatable on said post and having a spiral thread on one face, the slides having thread portions engaging the threads on the nut member whereby the slides are simultaneously operated.

18. In a razor, the combination of a polygonal plate having guard portions at its sides, a polygonal blade having cutting edges at each of its sides arranged to coöperate with the guards when secured to the plate, the guard plate having radially extending slots on one face with the opposite sides under-cut, slides having beveled side portions and movable in the slot portions of the plate, the slides having hooked portions extending around the corners of the guard plate to the opposite face, the inner faces of the extensions being inclined, integral spring portions in the guard plate at the bottom wall of the slot portions forming springs that extend normally outward away from the slotted side of the plate, lugs on the end of the spring portions lying beneath the inclined extensions, the blade having recesses at its corners to fit between the lugs of the springs and be engaged by the inclined portions of the slides, a post on the slotted side of the guard plate, a nut member rotatable on said post and having a spiral thread on one face, the slides having thread portions engaging the threads of the nut member whereby the slides are simultaneously operated, and a handle detachably secured to said post and organized to extend at different angles therefrom.

19. In a razor, the combination of a frame member provided with oppositely disposed guard portions, a blade member having cutting edges disposed to coöperate with said guard portions, resilient means carried by the frame member arranged to engage the blade, means connected with the frame member arranged to coöperate with the resilient means to support the blade offset from the frame member with the cutting edges of the blade in proximity to the guard portions of the frame, a handle having a polygonal tongue, the frame member being provided with a socket fitting such tongue, and means for removably securing the tongue in the socket portion.

20. In a razor, the combination of a frame member provided with oppositely disposed guard portions, a blade member having cutting edges disposed to coöperate with said guard portions, resilient means carried by the frame member arranged to engage the blade, adjustable means connected with the frame member arranged to coöperate with the resilient means to support the blade offset from the frame member with the cutting edges of the blade in proximity to the guard portions of the frame, a handle member, and means for detachably securing the handle member to the frame member in different predetermined positions.

21. In a razor, the combination of a polygonal frame member having guard portions along its sides, a polygonal blade having cutting edges on opposite sides arranged to coöperate with the guard portions when connected with the frame member, yieldable means adjustably connected with the frame member and organized to support the blade offset from the frame member with the cutting edges of the blade at varying distances from the guard portions, a handle member, and means for detachably securing the handle member to the frame in different positions in each one of which the handle extends inclined relative to one of the sides of the frame at the same predetermined angle.

22. In a razor, the combination of a polygonal frame member having guard portions along its sides, a polygonal blade having cutting edges on opposite sides arranged to coöperate with the guard portions when connected with the frame member, yieldable means adjustably connected with the frame member and organized to support the blade offset from the frame member with the cutting edges of the blade at varying distances from the guard portions, a handle having a polygonal tongue, the frame member being provided with a socket fitting such tongue whereby the handle can be fitted to the frame in different positions in each one of which the handle extends inclined to one side of the frame at the same predetermined angle.

23. In a razor, the combination of a frame member having fixed guard portions along opposite sides, a blade having cutting edges on opposite sides arranged to coöperate with the guard portions, and adjustable resilient means carried by the frame member and organized to support the blade with the cutting edges at different distances from the guard portions whereby the blade as a whole is bodily shifted to and from the guard portions in a path transverse to the plane of the blade edges.

24. In a razor, the combination of a frame member provided with a plurality of guard portions, a blade member having cutting edges disposed to coöperate with the guard portions, resilient means carried by the frame member and engaging the blade to press it away from the guard portions in a direction transverse to the plane of the blade edges, and adjustable means connected with the frame member and arranged to coöperate with the resilient means to support the blade offset from the guard portions.

25. In a razor, the combination of a frame member of substantially polygonal outline having guard portions along its sides, and adjustable resilient means mounted on the frame member and organized to engage the blade at its corner portions only adjacent the cutting edges whereby the blade is supported offset from the guard portions at variable distances.

26. In a razor, the combination of a frame member of substantially polygonal outline having guard portions along its sides, and adjustable resilient means mounted on the frame member and organized to engage the blade at its corner portions only adjacent the cutting edges whereby the blade is supported offset from the guard portions at variable distances, the blade being movable to and from the guard portions in a path transverse to the plane of the blade.

27. In a razor, the combination of a frame member of polygonal outline having guard portions along its sides, a blade of similar polygonal outline having portions removed at its corners, and adjustable resilient means arranged to engage the blade at its corner portions only.

28. In a razor, the combination of a frame member of polygonal outline having guard portions along its sides, a blade of similar polygonal outline having portions removed at its corners, and adjustable resilient means arranged to engage the blade at its corner portions only with the edges of the blade removed at different distances from the guard portions.

29. In a razor, the combination of a frame member provided with a guard portion, a blade, and means on the frame member arranged to engage the blade at its corner portions only, said means being slidable to engage some of said corners and movable toward and from other of said corner supporting portions to clamp and release the blade.

30. In a razor, the combination of a frame member provided with a guard portion, a blade having cutting edges on the opposite sides, and shiftable means on the frame member arranged to engage the blade at its corner portions only, whereby the blade is clamped with one of its cutting edges in proximity to the guard portion.

31. In a razor, the combination of a frame member having a guard portion, a blade, means on the frame member for engaging the blade at its corner portions only to clamp the blade with its edge in proximity to the guard portion, two of said blade engaging means being located at opposite ends of the guard portion and being movable relative to other said blade supporting means in a path parallel with the plane of the blade to clamp and release the blade.

32. In a razor, the combination of a frame member provided with a guard portion, a blade, means carried by the frame member and arranged to engage the blade at its corner portions only, some of said means being movable in a path parallel with the plane of the blade to removably secure the blade with its cutting edge in proximity to the guard portion.

33. In a razor, the combination of a frame member provided with a plurality of guard portions, a polygonal blade having cutting edges on all of its sides, means carried by the frame member and arranged to engage the blade at its corner portions only, some of said means being movable in a path parallel with the plane of the blade to removably secure the blade with its cutting edges in proximity to the guard portions.

34. In a razor, the combination of a polygonal frame member provided with a plurality of guard portions, a polygonal blade having cutting edges on all of its sides, and means on the frame member arranged to engage the blade at its corner portions only, said means being slidable to engage some of said corners and movable toward and from other of said corner supporting portions to clamp and to release the blade.

35. In a razor, the combination of a frame member having a plurality of guard portions, a polygonal blade having cutting edges on all of its sides, means on the frame member for engaging the blade at its corner portions only to clamp the blade with its edge in proximity to the guard portions, two of said blade engaging means being located at opposite ends of a guard portion, and movable relative to other of said blade supporting means in a path parallel with the plane of the razor to clamp and release the blade.

36. In a razor, the combination of a frame member having a guard portion, a polygonal blade having cutting edges on all of its sides, and means carried by the frame member and organized to engage the blade at its corner portions only to support the blade offset from the frame member at all other portions, the cutting edges of the blade being located in proximity to the guard portion.

37. In a razor, the combination of a polygonal frame member having guard portions, a blade of polygonal outline having cutting edges on all of its sides and having portions removed at its corners, and means carried by the frame member organized to engage the blade at the margins of the said corner portions on opposite faces of the blade whereby the blade is secured to the frame member free and offset from the frame member at all other portions.

38. In a razor, the combination of a frame member having guard portions, a blade having two or more cutting edges with a recess at the ends of the cutting edges, and securing means carried by the frame member arranged to engage the blade on opposite faces at the recessed corner portions with the blade at all other portions offset from the frame member.

39. In a razor, the combination of a frame member of substantially polygonal outline provided with guard portions, a blade of similar polygonal outline having cutting edges on all of its sides and having portions removed at its corners, and supporting means carried by the frame member and engaging the blade on opposite faces at said corner portions with the blade offset from the frame member at all other portions.

40. In a razor, the combination of a frame member having guard portions, a blade, means on the frame member arranged to engage the lower face of the blade at its corner portions only to support the blade offset from the frame member, and means carried by the frame member for engaging the upper face of the blade at its corner portions only to coöperate with said means to secure the blade to the frame member.

41. In a razor, the combination of a frame member having guard portions, a blade, shiftable means on the frame member arranged to engage the lower face of the blade at its corner portions only to support the blade offset from the frame member, and adjustable means carried by the frame member for engaging the upper face of the blade at its corner portions to coöperate with said means to secure the blade to the frame member at different distances removed therefrom.

RICHARD H. REED.
HENRY WILCOX.

Witnesses:
WILLIAM H. REID,
F. E. BOYCE.